July 12, 1949.  B. MARTIN  2,475,907
WELDING OF METAL STUDS TO METAL PLATES
Filed Sept. 11, 1945  3 Sheets-Sheet 1

Fig. 2.

July 12, 1949.  B. MARTIN  2,475,907
WELDING OF METAL STUDS TO METAL PLATES
Filed Sept. 11, 1945  3 Sheets-Sheet 3

Inventor
Bruce Martin
by Stevens and Davis
his attys

Patented July 12, 1949

2,475,907

UNITED STATES PATENT OFFICE 2,475,907

WELDING OF METAL STUDS TO METAL PLATES

Bruce Martin, Chatham, England

Application September 11, 1945, Serial No. 615,608
In Great Britain September 14, 1944

13 Claims. (Cl. 219—4)

1

This invention relates to apparatus for the electric arc welding of metal studs, tubes and the like to metal plates, bodies and the like, and is especially adapted for the welding of naval brass or other non-ferrous alloy studs to steel or steel alloy surfaces by a method such as that described in United States specification No. 1,410,421, and to the control of such apparatus.

The specification No. 1,410,421 describes a method in which in the electric welding of studs to plates the stud is first contacted with the plate, the welding circuit is completed, the stud is withdrawn from the plate to a predetermined distance to strike the arc between the stud and the plate and, after the arc has been maintained for a short but predetermined period, the molten end of the stud is forced against the oppositely disposed intensely heated part or crater of the plate to effect the weld, the current through the stud and the plate being maintained until the weld is completed.

The invention has among its objects to provide a light weight, compact, and readily portable welding tool, to provide a tool which is completely automatic in operation, and to provide a tool that can be utilised in cramped and difficultly accessible positions, such as are normally encountered in ships.

The invention has further among its objects to ensure the breaking of the control and welding circuits at the instant of completing each weld, independently of the operator, and to effect the breaking of the circuit in such a manner as to preclude further operation of the tool until the tool has been re-charged with a fresh stud and replaced in position upon the plate or surface to which the stud is to be welded.

The invention has also among its objects to ensure reliable and uniform arc striking with an alternating current supply irrespective of the prevailing conditions under which welding is carried out, to ensure satisfactory welds upon surfaces that are vertical or considerably out of the horizontal in the use of direct and alternating current supplies, to provide improved devices for use in the welding of studs and the like to steel or steel alloy surfaces, and to produce improved welds of studs and the like by the use of alternating current.

According to the invention, the apparatus comprises an electromagnet, an armature associated with the magnet and adapted for a limited movement towards and away from the pole or poles of the magnet, a spring acting on the armature in opposition to the magnet, a chuck for the reception of the stud or the like to be welded and adapted to be moved by the armature to effect the striking of the arc or to return the stud or the like to the metal surface to which it is to be welded and a casing for housing the magnet and the armature, the chuck being disposed exterior to the casing.

The invention also comprises the features hereinafter described and claimed.

The invention is illustrated, by way of example, in the accompanying drawings.

In carrying the invention into effect, by way of example, in the construction of a portable or hand welding tool, as illustrated in the accompanying drawings, an important feature contributing to light weight and compact construction is the use of a hinged or pivoted armature which cooperates with a simple electro-magnet to effect the movement of the stud for arc striking purposes.

The body or housing 1 of the welding tool, in which are mounted the electro-magnet and the hinged or pivoted armature, may be made of cast aluminium alloy or other metal or material and is advantageously approximately triangular or wedge-shape in plan and may be open at the forward end for the reception of a front housing 2, of gunmetal or other metal or material, for the slide of the chuck carrier. The housing 1 may be supported by three adjustable pointed steel or like studs or pins 3, two being symmetrically disposed at the base of the triangle or at the wider part of the wedge and the other at or near the rear.

The form of the magnet may vary and may be determined according to the purpose for which the apparatus is intended, but it is preferred to use a magnet having a yoke 4 and juxtaposed poles 5 and 6. The armature 7 is advantageously of a bar-like form and pivotally mounted at the rear end in such manner that it has freedom to move through a small angle in approaching or moving away from the poles of the magnet. At the forward end the armature is articulated or coupled to the slide of the chuck or stud holder 8, which is mounted to be impelled by the armature 7 along a straight-line path which may be determined by parallel guides.

In the particular construction illustrated, the body or housing 1 is provided to support the yoke 4 of the magnet by such means as screws 9 so that the poles 5 and 6 are directed downwardly. At the forward end the housing 1 has the front housing 2 secured to it by means of screws 10 which engage massive parallel flanges 11 of the front housing. The rear end of the housing 1 is slotted at 12 for the reception of cable clamping members 13, of brass or other metal, which are mounted in position and tightened by the screws 14. The housing 1 further has secured to it by screws 15 a removable handle 16 which is bifurcated at the front end. In order that the tool may alternatively be carried by the tool support of a machine tool, such as a drilling machine, there is advantageously provided a clearance hole 17 in the upper wall of the housing and in the magnet yoke 4 a screw-threaded bore for the reception of a screw-threaded supporting stem, after the handle has been removed. The bore may be otherwise closed by a plug 18.

The adjustable supporting studs or pins 3 may advantageously be formed with peripheral grooves 19 at a number of positions along the length for the reception of a suitably formed end or point upon the corresponding clamping screw 20. By such means similar and equal adjustment of all the studs or pins may be ensured. The forward studs or pins are conveniently received in bores formed in the flanges 11 of the front housing 2 while the rear stud or pin is received in a brass or like plug 21 inserted in a bore in the rear part of the housing 1. It will be evident that other means of securing the studs or pins 3 in the determined positions of adjustment may be used. For example, the studs or pins may be screw-threaded to engage screw-threaded bores in the housing and they may be secured in the adjusted positions by lock nuts.

The magnet yoke 4 is formed of mild steel or other magnetic material conveniently as a bar that is transversely bored to receive the upper ends of the poles 5 and 6. The pole 5, serving as a core to the coil of the electro-magnet, is solid and of circular cross-section and has a pole shoe 22 of larger diameter and small thickness serving to retain in position upon the pole the bobbin 23 of the magnet coil 24. The pole 6 is of square cross-section and is bored from the upper end for a purpose hereinafter defined.

The rear end of the armature 7 is riveted or otherwise secured to a fork-like carrier 25 the limbs of which are received into corresponding slots 26 formed in the lower part of the rear end wall of the housing 1 and therein secured by screwed hinge pins 27, the arrangement being such as to permit limited rotation about the hinge pins. The forward end of the armature is reduced in width and guided in a slot in the rear wall 28 of the front housing 2 and is longitudinally slotted to engage a connecting pin 29 mounted in the slide 30 of the chuck carrier.

The slide-way to receive the slide 30 of the chuck carrier is formed between parallel ribs 31 on the forward face of the rear wall of the front housing. The rear surface of the slide-way is formed by a plate 32, preferably of bronze, fixedly positioned between the ribs 31 while the guides 33 of the slide-way may conveniently be formed by bronze strips that are secured along the ribs to overhang the juxtaposed lateral faces thereof and to engage outwardly directed lateral flanges 34 on the slide 30 of the chuck carrier. The said slide is conveniently in the form of a rectangular steel block, having rearwardly directed parallel flanges 35 that at their rear outer edges are formed with the flanges 34. Alternatively the lateral walls of the parallel flanges 35 may be channeled to receive the guides 33. The lower face of the slide receives the connecting pin 29 and may be provided of slight transverse curvature having regard to the slight angular movement of the armature 7 in relation thereto. The forward part of the chuck carrier is a rectangular block 36 of insulating material screwed to the steel rear part, from which it is separated by a sheet of insulating material, and channeled at the middle of its width in the rear surface for the reception of a metal securing block 37 with which are engaged the screws whereby the welding supply cable connecting plate 38 and the base plate or flanges of the chuck clamp 39 are fixedly secured.

The cable connection plate 38 is conveniently formed at the two lateral edges with sockets 40 into which may be soldered or sweated the ends of the conductor of the supply cable 41 which is divided into two parts to facilitate the heavy transient current supply to the chuck. The front housing 2 may be provided with upper and front screening plates 42, 43.

The movement of the armature 7 away from the magnet may be limited by the provision of suitable stop members. Thus, a stop screw 44 engaged, for example, in a transverse screw-threaded hole in the rear part of the chuck carrier may be positioned to contact with a stop block such as the screw 45 or projection provided upon the plate 32.

To afford clearance for the screw, the middle of the upper part of the forward part of the chuck carrier may be recessed or cut away. The stop screw 44 may be otherwise supported, for example, in a direction normal to the armature in a rearward projection, lug or bracket on the rear face of the rear part of the chuck carrier.

The approach of the armature to the magnet poles may be limited only by contact of the armature with the poles, which may be faced with non-magnetisable material. There may, however, be provided adjustable stop members to determine the degree of approach. Thus, a stop screw supported in a bracket or carrier mounted on the plate 32 may be set to contact the upper face of the slide 30 of the chuck carrier.

The chuck or stud holder 8 may be of any convenient construction such that a stud or the like of a determined diameter or cross-section may be readily inserted and engaged with a determined amount of protrusion from the chuck or stud holder.

In the construction illustrated, the body of the chuck or stud holder consists of a tubular member that is provided at the lower end with a conical head 46 of slightly increased diameter and that is internally screw-threaded at the upper part for a determined length. The member is longitudinally slotted at 47 from the lower end in diametrical positions, the slots advantageously ending in circular holes. The body of the chuck or stud holder is thus given a degree of resilience whereby it may be caused to engage a collet 48, inserted in the bore, by means of an eccentric clamping ring 49 which embraces the body or member 8 and is recessed on the under face to form a seating for the head 46 of the body or member 8. The ring 49 is tapped radially at the widest part to receive a clamping screw 50. Exchangeable collets 48 adapted respectively to take differing diameters or cross-sections of studs or the like are conveniently provided in the form of a tubular member of an external diameter to fit slidably in the body or member 8 and having at the lower end a head 51 of increased diameter with milled periphery. The collet is diametrically slotted, as at 47, as in the case of the member 8, the slots advantageously ending in circular holes. The upper end of the collet may be formed with a bayonet slot to engage a radial pin or screw 52 in the member 8. The upper end of the chuck body or member 8 is closed by a screw-threaded plug 53 that is centrally bored and screw-threaded to receive an adjusting screw 54 with insulating head 55, whereby the extent of protrusion of a stud or the like from the collet 48 is determined. A lock nut may be provided to rest upon the plug 53.

It will be noted that on the removal of the plug 53, together with the adjusting screw 54, the bore of the collet is adapted to receive a stud or the like of any required length.

The chuck or stud holder may be mounted in any convenient form of clamp. Thus, as illustrated, the clamp comprises a metal block 39 having at the rear end the securing flanges and bored in a direction parallel with the slide-way to receive the chuck or stud holder 8. Near to and parallel with one lateral wall the block is cut through to the bore so that by means of a clamping screw 56 passing through the tongue thus formed the chuck or stud holder 8 may be firmly engaged.

The housing 1 advantageously is provided with a cylinder, the lower end of which lies in close proximity to the armature and which carries within it a plunger that is subject to spring action whereby the lower end of the plunger may be maintained always in contact with the armature and the armature may be moved away from the magnet on de-energisation of the latter for return of the stud or the like to the plate. The rod or stem of the plunger may be of such a length that when the chuck is charged with a stud or the like and the welding tool is set in the operative position with reference to the plate or the like to which the stud is required to be welded and the stud is set in contact with the said plate or the like the upper end of the rod or stem is flush with the upper end of the cylinder which may protrude through the upper surface of the housing or be flush therewith. The plunger may advantageously be provided to determine the extent of movement of the armature to strike the arc and for this purpose the plunger or its rod or stem may be adapted to contact a stop or a shoulder formed or fitted within the cylinder or exterior thereto. The position of the cylinder with reference to the housing may be adjustable to vary the protrusion from the housing of the plunger, but such adjustment is not necessary since, for a given setting of the tool, a constant distance of the chuck from the surface to receive the stud is advantageously maintained irrespective of variations in the lengths of the studs.

In the construction illustrated the pole 6 forms a hollow steel cylinder which completes the iron circuit of the electro-magnet and advantageously projects slightly more than the pole 5 to determine the lift of the armature. The spring-pressed plunger 57, preferably of brass or steel or composite metal construction, projects through an opening in the lower end wall to maintain contact with the armature 7 under the action of the spring 58 which bears upon a collar 59 on the plunger and at the upper end against a screw-threaded plug 60 whereby the cylinder is closed and a bearing afforded to the plunger 57. When the plunger 57 is set with the upper end approximately flush with the upper end of the cylinder plug 60, it is still possible upon the energisation of the electro-magnet for the armature 7 to lift the plunger 57 against its spring-pressure the predetermined short distance to cause the upper part of the plunger to protrude from the cylinder. The distance of protrusion of the plunger is a measure of the corresponding lift of the chuck or stud holder 8 and consequently of the length of the arc.

It is advantageous that the control circuit whereby the magnet and, where desirable, a contactor for closing the welding circuit are energised should incorporate a safety device or switch by which the said circuit may be maintained broken except when the chuck is charged with a stud and the housing of the apparatus is in the operative position with reference to the surface to which the stud is to be welded. For this purpose there may be provided a switch-operating rod or plunger that is secured to or contacts with the armature and that operates insulated spring contacts serving to make or break the control circuit but that may tend always to separate. Thus, when the apparatus is ready and in position for welding, the circuit is closed owing to the lifting of the rod or plunger by the magnet armature upon the latter being lifted when the stud is pressed into contact with the surface to which it is to be welded. The circuit is, therefore, maintained in the further rise of the armature upon the striking of the arc. It has to be noted that, while the circuit is closed at the time when the apparatus is ready for effecting the weld, the return movement of the stud to the plate for the completion of the weld under spring action on demagnetisation of the magnet is considerably greater by reason of the fact that the stud has shortened by the amount fused by the arc. As the apparatus is still in the operative position with respect to the plate, the control circuit is consequently opened by the return movement and remains opened until a fresh stud has been inserted into the chuck and the welding tool has been positioned again ready for welding the stud upon the surface of the plate.

In the construction illustrated, this safety switch comprises a switch body 61, of an insulating or plastic material, that is secured with the interposition of a sheet 62 of insulating material to a lateral face of the pole 6. The body 61 is bored to receive a metal plunger 63 having a contact head 64 upon which presses a spring 65 coiled about the plunger and received within a corresponding recess in the lower part of the body 61. At the upper end there is fitted a metal contact plate 66 having an integral sleeve for the plunger that is received into a recess in the upper end of the body. The lowest position of the plunger is determined by a nut 67 fitted to the upper end. The circuit through the switch, for example, to earth, is closed by a contact pin 68 carried by the armature. The contact pin 68 is advantageously adjustable upon the armature 7 towards and away from the plunger in order that the safety switch device may be rendered inoperative when necessary. Thus, precise opening position of the safety device during the return movement may be adjusted so that it may be rendered inoperative if it is found necessary to be able to maintain the welding current until the weld is complete in certain instances as, for example, in the welding of aluminium alloy studs.

Figure 1:
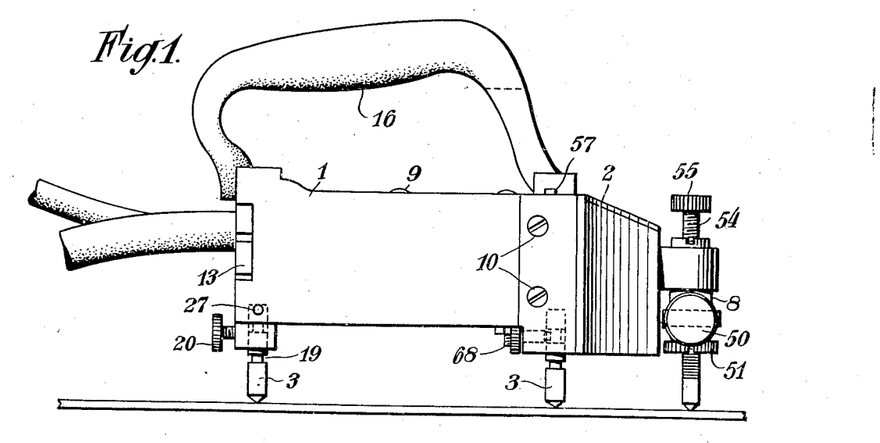
Figure 1 is a side elevation of a hand stud-welding tool according to the invention.
Figure 2:
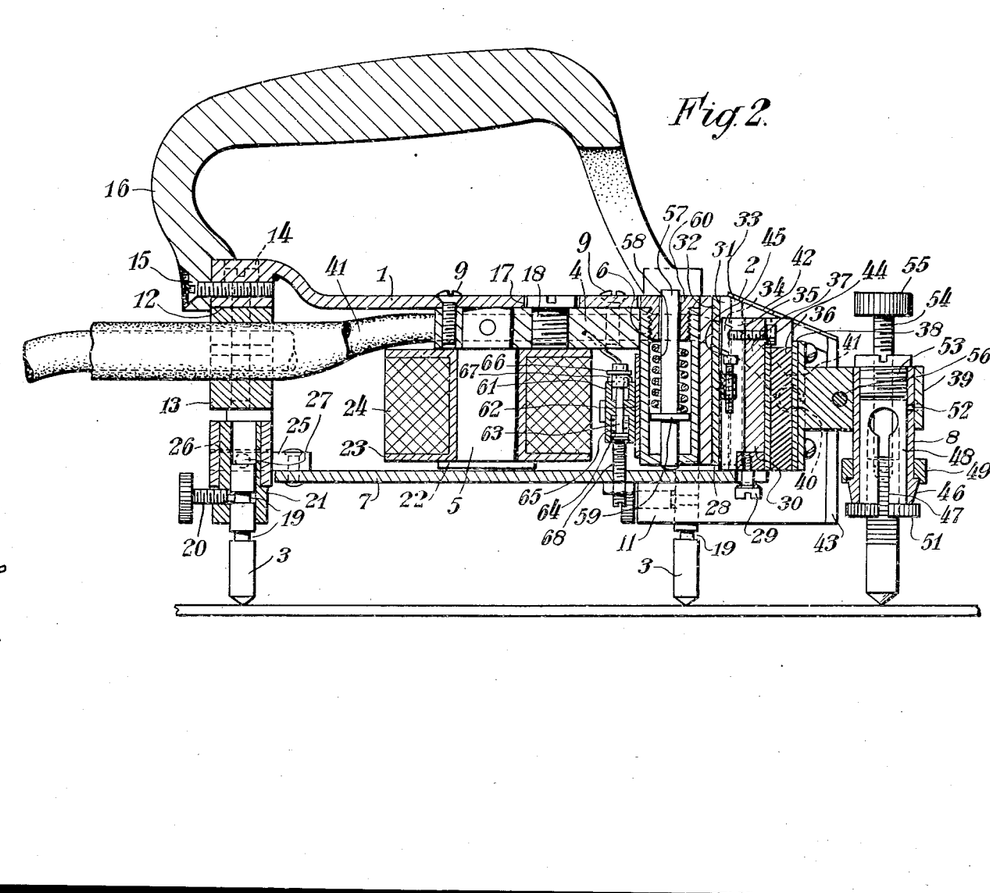
Figure 2 is a longitudinal section of the tool represented in Figure 1.
Figure 3:
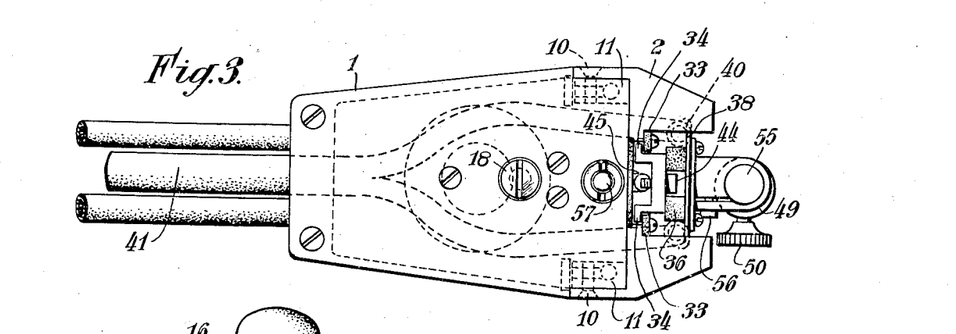
Figure 3 is a plan of the tool represented in Figures 1 and 2, the handle and front cover plates being removed.
Figure 4:
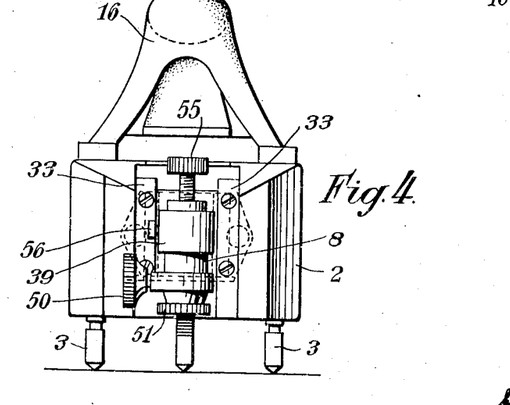
Figure 4 is a front elevation of the tool represented in Figures 1, 2 and 3, with front cover plates removed.
Figures 5, 6, 7:
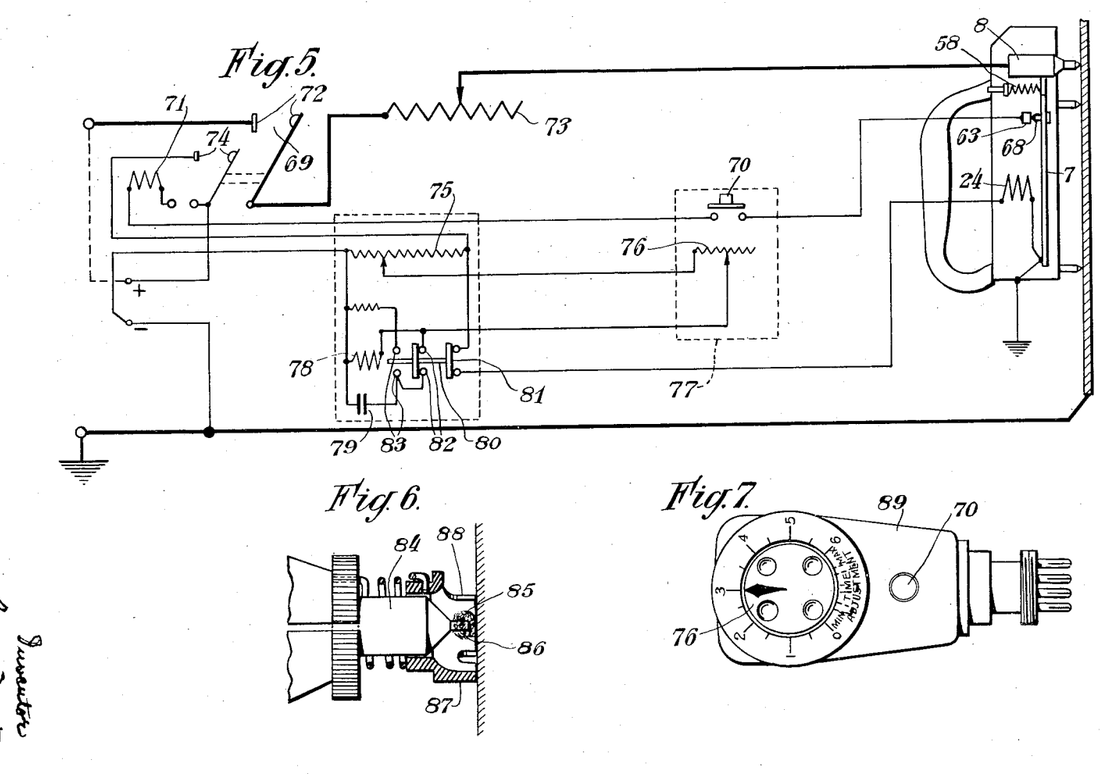
Figure 5 is a diagram of a system of electrical connections for a welding apparatus according to the invention, such as the tool represented in Figures 1 to 4.
Figure 6 is a detail view of a screen or sleeve for a stud such as may be welded by the apparatus according to the invention, for use under certain conditions of operation.
Figure 7 is a plan view of a control block which may be carried by the operator.

A typical diagram of electrical connections is illustrated in the drawings in Figure 5. The tool is connected through an automatically operated contactor 69 for the main welding circuit receiving current from a suitable source of welding supply, either a distribution system or a motor generator. In addition, this contactor, upon closing, ensures through auxiliary contacts the energisation of the electro-magnet coil 24 for arc striking purposes, the contactor control circuit being completed through a push button switch 70, which switch is also in series with the safety contact device 63 which is operated by means of the auxiliary contact engaging with or attached to the armature 7 of the welding tool.

Thus, upon pressing and retaining the push button switch 70 closed until completion of the weld, the main control circuit is completed, and the following operations result:

(i) The circuit for the main contactor operating coil 71 closes, with resulting closing of the main welding circuit at the contacts 72, whereby current flows between the stud and plate which are in contact under the pressure of the spring 58, this current being, however, normally limited by a suitably regulated resistance 73.

(ii) The operation of the main contactor at the same time completes a circuit through the electro-magnet coil 24, if necessary by closure of auxiliary contacts 74, thus causing the armature 7 to lift, together with the chuck or stud holder 8 and the stud, so as to form an arc between the stud and the plate.

(iii) An arc timing device is energised, which, by means of secondary contacts in series with the electro-magnet, after a pre-determined arc timing period may open the electro-magnet circuit, so that the stud is returned towards the plate under the pressure exerted by the spring 58 of the arc limiting device, but with the arc still maintained.

(iv) As the travel of the stud and its supporting mechanism is considerably greater upon the return of the stud to the plate than upon lifting from the plate for the striking of the arc owing to the melting of the stud and plate which occurs during the arc period, the contact pin, such as 68, associated with the armature travels sufficiently for the safety contacts to open, thereby also opening the circuit of the main contactor operating coil 71 with resultant openings of both the main welding circuit and the auxiliary operating circuit of the electro-magnet.

It is to be noted that during the sequence of operations hereinbefore described, as the molten end of the stud is returned to the plate to which it is welded at practically the exact instant or even just before the main welding circuit is broken, the rise of current in the main welding circuit which would otherwise occur upon short circuiting the arc is considerably minimised with beneficial effects, not only as regards the quality of the resulting weld due to the better formation of a reinforcing fillet of chilled metal around it, but also by reducing consequently the circuit breaking duty imposed upon the contactor.

Furthermore, the safety contact device normally prevents closure again of the main welding circuit from the push button until the welding tool has been re-set in position with a fresh stud for welding as hereinbefore described.

The use of a hinged or pivoted armature has the advantage that the return of the stud to the plate is effected with less of impact than would be the case in the use of a free armature and accordingly the scattering of molten metal is avoided or reduced to a minimum.

The arc timing device may advantageously operate upon the known condenser charging or discharging system, by which by varying the rate of charge or discharge of a condenser suitably connected in relation to a relay activating arrangement, accurately controlled timing is obtained of the period between the closing of the primary circuit of the timer and the opening of the secondary circuit resulting from the operation of the relay at the instant when the condenser reaches a predetermined state of charge or discharge.

Such a timing device is represented in Figure 5. The closing of the auxiliary contacts 74 of the contactor 69 permits the flow of current through the regulating resistance 75 and the variable resistance 76 of the control block 77 to the coil 78 of the timing relay and for the charging of the condenser 79. At the determined moment the coil 78 is energised to lift the plunger 80 to open the contacts 81, 82 respectively supplying the electro-magnet coil 24 and the condenser 79 and to close the contacts 83, whereby the condenser 79 may be discharged.

This simple device is well adapted for the purpose of stud welding as hereinbefore described, and its features are such that prolonged operation should be secured over a very large number of welding cycles without need for replacements and/or appreciable maintenance otherwise.

An alternative timing device which has also given satisfactory results for similar purposes is of the well-known "Rotherham" time delay type in which the time period is initiated by the energisation of a small solenoid, the core of the solenoid being connected by means of a rack to a small train of wheels which retards the movement of the rack under the pull of the solenoid. When, however, the solenoid core and rack move a sufficient predetermined distance, a secondary circuit is opened to complete the timing operation. This device also facilitates time period variations with reasonable accuracy for the purpose in question.

The arc time periods which are at present foreseen as being likely to be required in the use of the apparatus and the stud welding methods hereinbefore described, may vary between 0.05 second and 1.0 second, and either of the types of adjustable timing device before referred to should meet such arc time variation requirements with reasonable satisfaction.

The safety contact device and the arc timing devices as hereinbefore described are not limited in their use to the application specifically described. The safety contact device and/or an arc timing device as described may be applied with advantage to other stud welding apparatus in which solenoid and spring or pneumatic action is involved, and more particularly for stud welding with a main welding supply of alternating current. It is merely desirable, with solenoid actuation, that the stud holder of the welding apparatus shall be mounted on a carrier plate mounted at the lower end of the solenoid core in such a manner that the stud holder is clear of, instead of beneath, the solenoid core. It is thus possible for a hollow stud holder to be used that is provided to carry a screwed stud stop above it that is adjustable to determine the length of stud protruding from the stud holder so as to render effective the control resulting from the greater travel of the stud on its return to the surfaces to which it is to be welded.

This type of welding tool may also be adapted for alternating current control by suitably laminating or slotting the steel, iron or other material forming the magnetic circuit of the electromagnet.

The details of construction of the tool as hereinbefore described and illustrated in the drawings may be varied as may be required. Thus, for example, the armature may be mounted so that it may move in relation to the magnet parallel to itself along a straight-line path, and for the purpose may be connected to the frame or housing supporting the magnet by a parallel motion mechanism. Thus, there may be provided pairs of pivoted links set at the angles of a rectangle and adapted to fold in the direction of the longer sides of the rectangle and having the corresponding pivot pins linked together, the armature being constrained by guides against longitudinal movement. In such a construction the chuck may be mounted directly upon the armature so long as it is insulated. Again, the approach of the armature to the magnet poles may be limited by the provision of an axial stop sleeve on the plug 60 in which the stem of the plunger 57 is received, the spring 58 being coiled about the exterior of the sleeve. Thus, in an extreme movement of the armature, the plunger collar 59 will contact the inner end of the sleeve. Alternatively the magnetic circuit may be completed through the hinged end of the armature instead of through the hollow pole containing the spring and plunger. With this construction some shortening of the welding tool may be possible.

Reliable and uniform formation of the arc, more particularly in the use of an alternating current supply, may be ensured by providing (Figure 6) the stud 84 with a readily fusible projection 85, and by interposing between the stud provided with the fusible projection and the surface to which it is to be welded a pellet or wad 86 of fibrous material that is electrically conductive and which fuses when the flow of the welding current is being established between the stud and the surface.

The pellet or wad may be of any material that will fuse readily under the conditions of arc formation. It is preferred, however, to use a pellet or wad of finely divided steel wool, which is twisted, woven and/or compressed in such manner as to facilitate the manufacture of uniform pellets or wads suitable for the purpose. The association according to the invention of the pellet or wad with the stud having the fusible projection is advantageous as the projection affords simple and effective means for centering and retaining the fusible pellet or wad in position and for securing the spacing of the stud at a uniform distance from the surface to which it is to be welded for the formation of the arc. The pellet or wad may be of annular shape so that the projection of the stud may extend through it into contact with the surface to which the stud is to be welded and to ensure contact of the projection with the said surface to secure reliable spacing of the stud therefrom. Where the pellets or wads are of uniform formation it will suffice, however, that they should be recessed to receive the end of the projection of the stud.

The association of the pellet or wad with the projection of the stud according to the invention is advantageous in the method of welding with apparatus wherein the stud is spaced from the surface to which it is to be welded for the striking of the arc and is only pressed home for the weld, the magnet or other means for withdrawing the stud from the plate being used only for the purpose of maintaining the stud in position until it is required to be pressed home on the plate.

By such means it is possible to secure under all conditions of operation reliable and uniformly repeated striking of the arc with a minimum of failures, notwithstanding the difficulties that normally attend the formation of an alternating current arc under the conditions hereinbefore stated. Where the weld is to be effected of a steel stud upon a vertical surface or a surface at a considerable angle to the horizontal, as hereinbefore stated, the reliable and uniform formation of the arc does not necessarily result in a perfect weld, even when the precaution is taken to surround the stud by means of a sleeve or screen of non-conductive refractory material. While the adverse effects of gravity are minimized by the use of such sleeves or screens and in alternating current arc stud welding, beneficial results have been secured by slotting or castellating the skirt of the sleeve or screen, it is found that the reliability and uniformity of arc formation or striking when using alternating current is prejudicially affected by the abnormal blow-out action upon the arc resulting from the rapid expansion of air and gases generated on the striking of the arc in the confined arc-striking zone, although this action is somewhat minimized when the sleeve or screen used is slotted or castellated.

According to a further feature of the present invention, therefore, in the welding of steel or like studs or like bodies to a vertical surface or a surface at a considerable angle to the horizontal by the use of alternating current or direct current, a sleeve or screen 87 for the stud or the like 84 is provided that has a large sector removed as at 88 and that is positioned so that the gap produced is located at the upper side of the arc striking zone when the stud is in position upon the vertical or other surface. The sector removed may extend over any angle consistent with the retention of the sleeve or screen upon the stud but for convenience in use and to permit ready location of the sleeve or screen upon the stud, the sector removed is confined to the skirt of the sleeve or screen at the part that lies adjacent the surface upon which the weld is being effected and may then advantageously extend over an angle of 90 degrees or more.

The use of such a gapped sleeve or screen not only minimizes blowout action upon the arc but, in providing a free vent in an upward direction for the current of air or gas, ensures a definite retardation and reduction of the rapid dropping of molten metal which otherwise takes place as hereinbefore stated. Such a sleeve or screen is thus effective not only to assist arc formation in alternating current welding but also to assist to secure uniformity of the weld fillets surrounding the zone of the stud weld both in alternating current and direct current welding. The presence of the gap in the sleeve or screen is also of advantage in facilitating the location of the stud in position for welding as the welding end may be observed where it is otherwise concealed by the sleeve or screen.

Where the methods of welding studs, tubes and the like hereinbefore described are applied to the welding of studs, tubes and the like of small diameters, such as below one quarter of an inch in diameter, it is advantageous to employ an arc timing control device of the condenser charge type, such as is hereinbefore described, since by the use of such a control device it is possible to operate with an arc timing period as short as 0.05 second which is found to be satisfactorily obtainable with such a control device.

According to a further feature of the present invention, means may be provided for effecting accurate arc timing adjustment when welding small studs, tubes and the like, such as those to which reference is hereinbefore made, by the use of a remote control device that may be carried by or accompany the operator where the main arc timing control device is required to be retained in a determined position. Such conditions may particularly arise in the use of a portable welding tool on ship work where relatively considerable areas require to be covered by the operator and where it would be inconvenient to move the arc timing device so that it may accompany the operator.

The remote control device for effecting time adjustment may comprise merely the features of the control block described with reference to Figure 7, that is, a variable time-adjusting resistance 76 and the push button or other control switch 70 fitted in a small case 89 which may be carried upon the operator by means of a collar, belt or neckband. Such a time-adjusting resistance may be connected to the main control device by a single two-core cable which is in circuit with the condenser of the main control device which is preferably located in the controller of the welding tool. By such means instantaneous and local adjustment of the arm timing period may be effected readily and conveniently by the operator without the necessity to leave the working position.

It will be understood that while the use of the remote control device hereinbefore referred to is advantageous in effecting the welding of studs, tubes and the like according to the invention as hereinbefore described, it is also applicable in methods of welding studs, tubes and the like generally.

According to the invention, moreover, in the welding of studs and the like by the use of alternating current, the stud or the like provided with a readily fusible projection may be first contacted by means of the projection with the surface to which it is to be welded, whereupon, after the welding current is flowing, it is withdrawn out of contact with the surface for the formation of a high current density arc before the projection is completely fused, the distance of the withdrawal being less than the required arc length. By this method the arc formed on the lift of the fusing projection almost instantly completes the fusion of the projection without explosive violence and the arc thereupon expands over the full area of the stud or the like with such relative smoothness that the otherwise liable alternating current arc blow-out or failure is prevented. The reliable and uniform formation of the alternating current arc is facilitated by the heating effect produced at the zone of contact of the fusible projection of the stud or the like and the plate or other surface immediately before the stud or the like is lifted to strike the short arc.

It is advantageous that the welding surface of the stud or the like and the fusible projection should be metallized with aluminium or other metal of high electrical conductivity.

Relatively small studs of steel up to about $\frac{1}{8}$ of an inch in diameter may be welded by the method of the invention advantageously by the use of alternating current supplied from a transformer of such type and capacity as to avoid any appreciable drop in the supply voltage when favourable arc-striking conditions are ensured by reason of the phase displacement effect resulting from the relatively high value of the current-limiting inductance in circuit. A minimum alternating current supply voltage of about 100 appears desirable.

Welding apparatus such as the tool hereinbefore described and illustrated in the drawings has proved satisfactory for carrying out the method now described. It is preferable for the purpose to apparatus in which the arc-striking lift is effected by a solenoid for the reason that the movement of the stud from the plate is appreciably slower in consequence of the leverage with which the stud holder is operated, frictional effects and/or inertia effects. Further, by reason of the overhang of the chuck or stud holder and the fact that there is inevitably slight play in the connection of the slide with the pivoted armature, the end of the projection of the stud is given a slight wiping action upon the plate as the stud is lifted that appears to be beneficial in the striking of the arc uniformly and smoothly. A further favourable feature of the apparatus in question is that the design ensures that the stud holder is mounted clear of the main parts of the apparatus and is carried by the armature outside the magnetic circuit, thus avoiding the magnetic effects resulting in arc blow-out that are encountered in the case of apparatus provided with a solenoid, probably by reason of the location of the stud in the axis of the solenoid and at the end of the core. Such arrangement favours the formation by induction of a magnetic pole at the welding end of the stud.

Arc timing devices other than those hereinbefore described may be used. Thus, a pneumatic relay timing device with orifice regulation may be used.

I claim:

1. Apparatus for the electric arc welding of metal objects in the form of studs, tubes and the like to metal plates, bodies and the like, comprising a housing, an electro-magnet within the housing, an armature transversely disposed to the core of the magnet and adapted for limited movement towards and away from the core, a spring acting upon the armature in opposition to the attractive force of the magnet, a chuck for the object to be welded disposed exterior to the housing, a carrier for the chuck adapted for movement in a direction normal to the surface to which the object is to be welded and directly connected to the armature to receive therefrom movement towards and away from the surface and electrical means for the control of the energization of the magnet and of the welding circuit including a control circuit and a normally open switch device therein, the switch device being closed and maintained closed by the armature when the latter is positioned at or within a determined distance from the magnet core.

2. Apparatus for the electric arc welding of metal objects in the form of studs, tubes and the like to metal plates, bodies and the like, comprising a housing, an electro-magnet within the housing, an armature transversely disposed to the core of the magnet and pivotally connected to the housing for limited movement towards and away from the core, a spring acting upon the armature in opposition to the attractive force of the magnet, a chuck for the object to be welded disposed exterior to the housing, a carrier for the chuck adapted for movement in a direction normal to the surface to which the object is to be welded and directly connected to the armature to receive therefrom movement towards and away from the surface and electrical means for the control of the energization of the magnet and of the welding circuit including a control circuit and a normally open switch device therein, the switch device being closed and maintained closed by the armature when the latter is positioned at or within a determined distance from the magnet core.

3. Apparatus for the electric arc welding of metal objects in the form of studs, tubes and the like to metal plates, bodies and the like, comprising a housing, an electro-magnet within the housing, an armature transversely disposed to the core of the magnet and adapted for limited movement towards and away from the core, a casing within the housing, a plunger movable within the casing towards and away from the armature and adapted to contact the armature, a spring acting upon the plunger and tending always to force it in the direction to move the armature in opposition to the attractive force of the magnet, a chuck for the object to be welded disposed exterior to the housing, a carrier for the chuck adapted for movement in a direction normal to the surface to which the object is to be welded and directly connected to the armature to receive therefrom movement towards and away from the surface and electrical means for the control of the energization of the magnet and of the welding circuit including a control circuit and a normally open switch device therein, the switch device being closed and maintained closed by the armature when the latter is positioned at or within a determined distance from the magnet core.

4. Apparatus for the electric arc welding of metal objects in the form of studs, tubes and the like to metal plates, bodies and the like, comprising a housing, an electro-magnet within the housing, an armature transversely disposed to the core of the magnet and adapted for limited movement towards and away from the core, a casing within the housing, a plunger movable within the casing towards and away from the armature and adapted to contact the armature, a spring acting upon the plunger and tending always to force it in the direction to move the armature in opposition to the attractive force of the magnet, the said plunger indicating by its position in relation to the casing the extent of the lift of the armature, a chuck for the object to be welded offset from the axis of the magnet core and adapted to be moved by the armature towards and away from the surface to which the object is to be welded and electrical means for control of the energization of the magnet and of the welding circuit including a control circuit and a normally open switch device therein, the switch device being closed and maintained closed by the armature when the latter is positioned at or within a determined distance from the magnet core.

5. Apparatus for the electric arc welding of metal objects in the form of studs, tubes and the like to metal plates, bodies and the like, comprising an electro-magnet, an armature transversely disposed to the core of the magnet and adapted for limited movement towards and away from the core, a spring acting upon the armature in opposition to the attractive force of the magnet, a chuck for the object to be welded offset from the axis of the magnet core and adapted to be moved by the armature towards and away from the surface to which the object is to be welded, an adjustable stop limiting the approach of the armature to the core of the magnet and electrical means for control of the energization of the magnet and of the welding circuit including a control circuit and a normally open switch device therein, the switch device being closed and maintained closed by the armature when the latter is positioned at or within a determined distance from the adjustable stop.

6. Apparatus for the electric arc welding of metal objects in the form of studs, tubes and the like to metal plates, bodies and the like, comprising a chuck for the object to be welded, a support for the chuck adapted to be applied to the surface to which the object is to be welded and upon which the chuck is mounted for movement towards or away from the said surface, electrically controlled means for imparting movement to the chuck and a control circuit and normally open switch device therein determining the operation of the said means and controlling the welding circuit, which switch device is controlled by the movements of the chuck and is closed when the chuck is charged with an object and the latter is contacted with the said surface and remains closed when the chuck is positioned away from the surface on the formation of the arc and is opened when, upon the expiration of the determined duration of the arc, the heated object is pressed home upon the heated surface, by reason of the greater travel of the chuck towards the surface resulting from the shortening of the object by fusion.

7. Apparatus for the electric arc welding of metal objects in the form of studs, tubes and the like to metal plates, bodies and the like, comprising a support adapted to be applied to the surface to which the object is to be welded, an electro-magnet carried by the support, an armature transversely disposed to the core of the magnet and adapted for limited movement towards and away from the core, a spring acting upon the armature in opposition to the attractive force of the magnet, a chuck for the object to be welded offset from the axis of the magnet core and adapted to be moved directly by the armature towards and away from the surface to which the object is to be welded, an electrical control circuit for the control of the energization of the magnet and of the welding circuit and a normally open switch device included in the control circuit, an element of which switch device is contacted by the armature on its approach to the core of the magnet and closes the switch device, the latter again opening when the armature is forced by the spring away from the core beyond a predetermined limiting position.

8. Apparatus for the electric arc welding of metal objects in the form of studs, tubes and the like to metal plates, bodies and the like, comprising a support adapted to be applied to the surface to which the object is to be welded, an electromagnet carried by the support, an armature transversely disposed to the core of the magnet and adapted for limited movement towards and away from the core, a spring acting upon the armature in opposition to the attractive force of the magnet, a chuck for the object to be welded offset from the axis of the magnet core and adapted to be moved by the armature towards and away from the surface to which the object is to be welded, an electrical control circuit for the control of the energisation of the magnet and of the welding circuit and a switch device included in the control circuit and comprising a contact element mounted for movement towards and away from the armature, a spring acting upon the said contact element to bias it towards the armature, and a contact element carried by the armature, the circuit being completed when the armature, in moving towards the core, moves the contact element carried by it into contact with the movable contact element and being broken when the armature moves away from the core beyond a predetermined limit.

9. Apparatus for the electric arc welding of metal objects in the form of studs, tubes and the like to metal plates, bodies and the like according to claim 8, provided with at least one of the contact elements adjustable in position for the determination of the precise position of the armature as it moves away from the core at which the switch device is opened.

10. Apparatus for the electric arc welding of metal objects in the form of studs, tubes and the like to metal plates, bodies and the like, comprising a support adapted to be applied to the surface to which the object is to be welded, a chuck for the object mounted upon the support for movement towards and away from the surface, a spring acting to move the chuck towards the surface, electrically controlled means for moving and retaining the chuck against the action of the spring, an electrical control circuit for determining the operation of the said means, relay-controlled means closing the said circuit and a condenser included in the circuit and the rate of functioning of which determines the operation of the relay-controlled means to open the circuit.

11. Apparatus for the electric arc welding of metal objects in the form of studs, tubes and the like to metal plates, bodies and the like, comprising a support adapted to be applied to the surface to which the object is to be welded, an electromagnet carried by the said support, an armature transversely disposed to the core of the magnet and adapted for limited movement towards and away from the core, a spring acting on the armature in opposition to the attractive force of the magnet, a chuck for the object to be welded offset from the axis of the magnet core and adapted to be moved directly by the armature towards and away from the said surface according as the magnet is energised or de-energised, an electrical control circuit for determining the energisation of the magnet, relay-controlled means for closing the said circuit and an electrical condenser in the said circuit the rate of functioning of which condenser determines the operation of the relay-controlled means to open the circuit.

12. Apparatus for the electric arc welding of metal objects in the form of studs, tubes and the like to metal plates, bodies and the like, comprising a chuck for the object to be welded adapted for movement towards and away from the surface to which the object is to be welded, electrically controlled means for imparting movement to the chuck when the arc is struck between the object and the surface and contact between the object and the surface is effected on the expiration of the duration of the arc, an electrical control circuit, an electrical condenser included in the said circuit, relay-controlled means for closing the said circuit, the condenser and a regulator for determining the rate of functioning of the condenser all included in the said circuit, and a portable controller adapted to be carried by the welding operator, the said controller comprising a switch for closing the control circuit and the said regulator, and the rate of functioning of the condenser determining the operation of the relay-controlled means to open the circuit.

13. Apparatus for the electric arc welding of metal objects in the form of studs, tubes and the like to metal plates, bodies and the like, comprising a housing, an electro-magnet within the housing, an armature transversely disposed to the core of the magnet and adapted for limited movement towards and away from the core, a spring acting upon the armature in opposition to the attractive force of the magnet, adjustable supports for the housing whereby it may be supported upon the surface to which the object is to be welded, a chuck for the object to be welded offset from the axis of the magnet core exterior to the housing and adapted to be moved directly by the armature towards and away from the surface in a direction parallel with the supports, a welding circuit in which are connected as arc electrodes the object and the surface to which the object is to be welded, a control circuit, and an arc timing device and a portable controller included in the said control circuit and controlling the welding circuit and the duration of the interval between energisation and de-energisation of the magnet.

BRUCE MARTIN.

REFERENCES CITED

The following references are of record in the file of this patent:

UNITED STATES PATENTS

| Number | Name | Date |
|---|---|---|
| Re. 22,411 | Nelson | Dec. 21, 1943 |
| 1,410,421 | Steele et al. | Mar. 21, 1922 |
| 2,115,707 | Crecca et al. | May 3, 1938 |
| 2,117,035 | Oesterlien | May 10, 1938 |
| 2,191,494 | Nelson | Feb. 27, 1940 |
| 2,315,502 | Crecca et al. | Apr. 6, 1943 |
| 2,356,320 | Hughes | Aug. 22, 1944 |
| 2,402,659 | Nelson | June 25, 1946 |